J. E. BEVINGTON.
VALVE PACKING.
APPLICATION FILED NOV. 3, 1916.

1,239,866.

Patented Sept. 11, 1917.

WITNESSES:
Robert L. Bruck
H. J. Duall

INVENTOR.
John E. Bevington
By Hull, Smith, Buck & West
ATTYS.

UNITED STATES PATENT OFFICE.

JOHN E. BEVINGTON, OF CLEVELAND, OHIO, ASSIGNOR OF ONE-HALF TO ALTON H. GREELEY, OF WEST DOVER, OHIO.

VALVE-PACKING.

1,239,866.   Specification of Letters Patent.   Patented Sept. 11, 1917.

Application filed November 3, 1916.   Serial No. 129,261.

*To all whom it may concern:*

Be it known that I, JOHN E. BEVINGTON, a citizen of the United States, residing at Cleveland, in the county of Cuyahoga and State of Ohio, have invented a certain new and useful Improvement in Valve-Packing, of which the following is a full, clear, and exact description, reference being had to the accompanying drawings.

This invention relates generally to improvements in valve packing, and has particular reference to a valve packing which is especially well adapted for use with rotary valves of the type employed in connection with the internal combustion engine shown in my copending application for United States Letters Patent, Serial No. 649,898, filed September 18, 1911. In fact, my present invention is an improvement over the packing means used in the aforesaid engine, and although it is herein shown in such connection, it is obvious that it has a much broader field of service, it being capable of employment with various styles of valves and in numerous other connections.

The objects of my invention are to provide a packing for rotary valves which is very efficient; which is self adjusting; which is simple of construction, and economical of production. An important feature of my invention is the means I employ for pressing the packing against the valve body, such means involving a spring which is removed from the zone of heat and thus unaffected by the heat when the valve is used in connection with internal combustion engines. This feature also facilitates the inspection of the spring and the replacing of it, should the same become weakened or broken.

Figure 1:
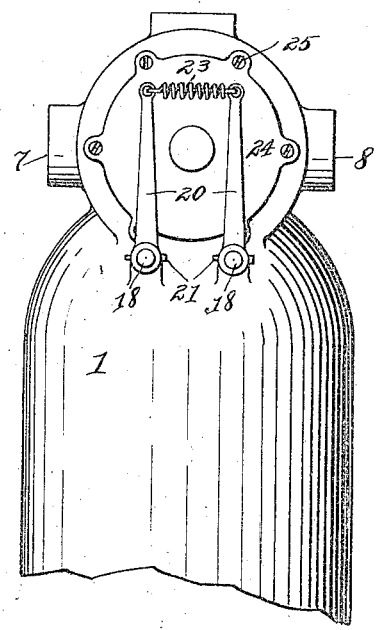
Figure 2:
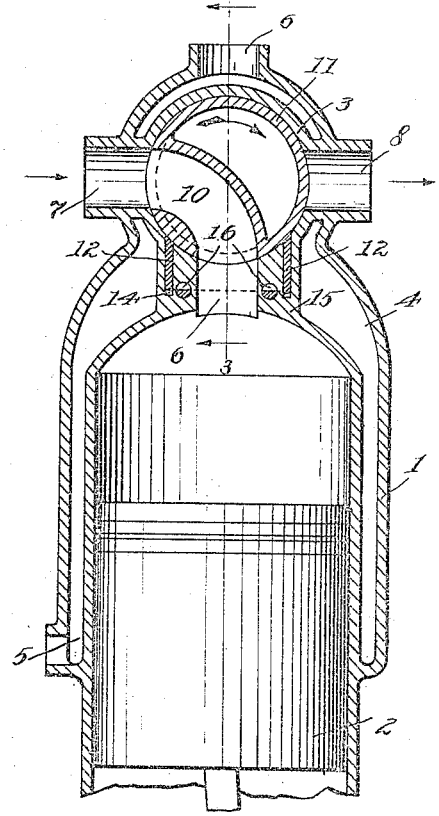
Figure 3:
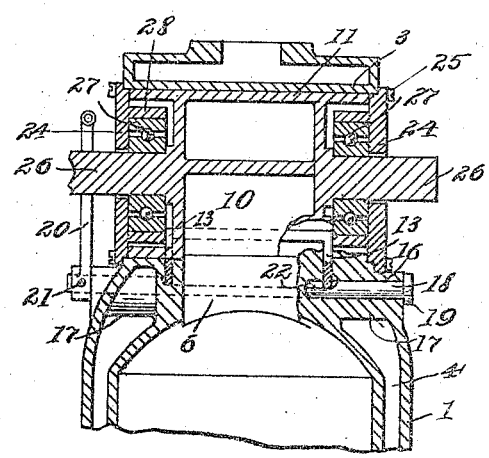
Figure 4:
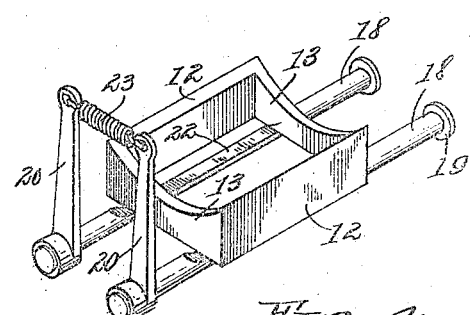

Because of its peculiar adaptability to internal combustion engines, I have illustrated it in such connection in the accompanying drawing, although I do not limit myself to such use alone. In the drawing, Figure 1 represents a partial side elevation of a cylinder of an internal combustion engine having a rotary valve with my invention applied thereto; Fig. 2 is a central, vertical section through the engine cylinder and valve which is shown in Fig. 1, such section being on a parallel plane to the aforesaid elevation; Fig. 3 is a section on line 3—3 of Fig. 2, looking in the direction of the arrows; and Fig. 4 is a perspective of the valve packing and means for pressing it toward and against the valve body.

Referring to the drawing by the use of reference characters, 1 represents the cylinder of an internal combustion engine within which is adapted to reciprocate the piston 2. Extending transversely across the upper end of the cylinder is a cylindrical valve casing 3 and a water jacket 4 incloses the valve casing and the combustion end of the cylinder 1 and has an inlet at 5 and an outlet at 6. The valve casing is provided with an admission port as shown at 7, and an exhaust port as shown at 8, which are adapted to communicate, alternately, with the port 9 which extends from the upper end of the cylinder, through the passageway 10 of the valve body 11 as it rotates in the direction indicated by the arrow in Fig. 2.

To prevent leakage of gas from the engine cylinder through port 9 and between the adjacent faces of the valve body and the valve casing, I provide the packing means which forms the subject matter of my present invention, and because of its formation, I will refer to such means hereinafter as the packing frame. As shown most clearly in Fig. 4, the packing frame is rectangular in plan and comprises side walls 12 and end walls 13. The underneath edges of the various walls or, in other words, the lower face of the frame is of a continuous plane, while its upper face is curved to conform to the contour of the valve body. This results, of course, in the sides 12 having transversely beveled upper edges while the upper edges of the end walls 13 are curved longitudinally of the walls. The packing frame 12—13 occupies a rectangular channel 14 which is formed in the neck of material 15 whereby the upper end of the cylinder 1 and the cylindrical valve casing are connected.

Extending through the neck 15 and bisecting the bottom portion of the channel 14 are parallel bores 16, the same being preferably located at equal distances from the vertical center of the engine. These bores extend through bosses 17 which bridge the water jacket 4 and which project a slight distance from the outer wall of the engine cylinder. A rock shaft 18 is contained within each of the bores 16 and has a head 19 at one end which engages the outer face of the boss 17, and at the other end the shaft projects beyond the face of the corresponding boss 17 a sufficient distance to receive an arm 20 which is pinned thereto at 21. The central portion of each of the shafts 18 is cut away to a depth of about one half its diameter, as shown at 22. When the parts are assembled the lower edges of the end walls 13 of the packing frame rest upon the straight sides of the cut away portions 22 of the shafts 18 near the ends of such cut away portions. From this explanation it is obvious that upon a partial rotation of the shafts 18, the packing frame will be elevated and its upper edge presented to the body of the valve 11. To rock this shaft and thus press the packing against the valve body, I provide a tension spring 23 which connects the upper ends of the arms 20.

From the foregoing description it will be seen that I provide a self adjusting and highly efficient packing for a rotary valve, and have located the spring whereby the packing is forced against the valve body, when the same is used in connection with an internal combustion engine, entirely outside of the engine where it is removed from the intense heat thereof and is subjected to the cooling effects of the atmosphere, and where it is easily accessible for purposes of inspection or repair.

In accordance with the construction of my engine shown in my previously mentioned application, I provide plates 24 as closures for the end of the valve casing 3 which may be secured to said casing by screws 25, said plates acting to prevent longitudinal movement of the valve within the casing. The stems 26 of the valve are supported by ball bearings 27 which are embraced by the flanges 28 extending inwardly from the inner faces of the plates 24.

Having thus described my invention, what I claim is:—

1. The combination, with a valve body, of a casing therefor which is provided with a port and having a channel adjacent said port and a bore intersecting the channel, packing means within the channel, a rocking element within the bore for engaging the packing means and adapted when rocked to press it against the valve body, and means for rocking said element.

2. The combination, with a valve body, of a casing therefor having a port and a channel adjacent said port and a bore which intersects said channel, packing means within the channel, a shaft within the bore, said shaft having an eccentric portion adjacent the channel for engagement with the packing means, and means located outside of the valve casing which tends to rock the shaft.

3. The combination, with a valve body, of a casing therefor having a port which is surrounded by a channel and bores which intersect said channel, packing means within the channel, a shaft within each bore, said shaft having an eccentric portion adjacent the channel for engagement with the packing means, and means located outside of the valve casing and connected to the shafts and tending to rock them.

4. The combination, with a valve body, of a casing therefor having a port and a channel adjacent said port and having a pair of bores which intersect said channel, packing means within the channel, a shaft in each bore which has an eccentric portion for engagement with the packing means where said shaft extends through the channel, arms extending from the adjacent ends of the shafts, and a spring connecting said arms.

5. The combination, with a rotary valve body, of a casing therefor having a port which is surrounded by a channel and having a pair of bores which intersect said channel, packing means within the channel, a shaft in each bore which projects without the casing and which has an eccentric portion for engagement with the packing means where said shaft extends across the channel, an arm secured to the end of each shaft where it projects without the casing, and a spring connecting the outer ends of said arms and tending to rock the shafts in opposite directions.

6. The combination of a valve body, a casing therefor, packing means within the casing, a rocking element for moving the packing means into engagement with the valve body, and means for rocking said element.

7. The combination of a valve body, a casing therefor, packing means within the casing, a pair of rocking elements for moving the packing means into engagement with the valve body, and means common to both of said elements for rocking them.

In testimony whereof, I hereunto affix my signature.

JOHN E. BEVINGTON.

Copies of this patent may be obtained for five cents each, by addressing the "Commissioner of Patents, Washington, D. C."